(12) United States Patent
Reeb

(10) Patent No.: US 7,953,649 B2
(45) Date of Patent: May 31, 2011

(54) INTERFACE BETWEEN ONLINE SALARY STATEMENT AND TAX DECLARATION PROGRAM

(75) Inventor: Andreas Reeb, Schifferstadt (DE)

(73) Assignee: SAP AG, Walldorf (DE)

( * ) Notice: Subject to any disclaimer, the term of this patent is extended or adjusted under 35 U.S.C. 154(b) by 1332 days.

(21) Appl. No.: 10/919,917

(22) Filed: Aug. 16, 2004

(65) Prior Publication Data

US 2006/0085303 A1    Apr. 20, 2006

(51) Int. Cl.
G06F 17/22    (2006.01)
(52) U.S. Cl. .......................................... 705/31
(58) Field of Classification Search .................. 705/31
See application file for complete search history.

(56) References Cited

U.S. PATENT DOCUMENTS

| | | | |
|---|---|---|---|
| 6,185,683 B1* | 2/2001 | Ginter et al. | 713/176 |
| 6,202,052 B1* | 3/2001 | Miller | 705/31 |
| 6,401,079 B1* | 6/2002 | Kahn et al. | 705/30 |
| 6,516,996 B1* | 2/2003 | Hippelainen | 235/379 |
| 6,697,787 B1* | 2/2004 | Miller | 705/31 |
| 7,107,322 B1* | 9/2006 | Freeny, Jr. | 709/217 |
| 2002/0023055 A1* | 2/2002 | Antognini et al. | 705/40 |
| 2005/0125335 A1* | 6/2005 | Bross et al. | 705/39 |

* cited by examiner

Primary Examiner — F. Ryan Zeender
Assistant Examiner — Faris Almatrahi
(74) Attorney, Agent, or Firm — Finnegan, Henderson, Farabow, Garrett & Dunner, LLP

(57) ABSTRACT

A method of electronically reporting information in response to an agency's request for information is disclosed. The electronic reporting process allows a user to report data and to file a declaration with the requesting agency. In particular, a tax agency can electronically request income tax information from a taxpayer. The taxpayer's employer can provide its employee's tax information electronically. The taxpayer can file a tax declaration with the tax agency electronically.

14 Claims, 8 Drawing Sheets

INTERFACE BETWEEN ONLINE SALARY STATEMENT AND TAX DECLARATION PROGRAM

TECHNICAL FIELD

This invention relates generally to an electronic reporting process, and more particularly, a process of electronically requesting information by an entity and electronically reporting the requested information by a party, who is obliged to respond to the entity's request and/or a third party, who is in possession of the requisite information.

BACKGROUND ART

When an agency or entity needs to solicit information from a user, it may send or provide the user a blank report form to complete. The user would either type or write the data in the report form. In other instances, the user forwards the blank report form to a third party, who is in possession of the requisite data, for completion. Upon receipt of the completed report form, the user may use the data on the completed report form to submit a separate report containing additional data to the requesting agency along with the completed report form.

For example, in Germany the Inland Revenue (i.e., the agency) sends a taxpayer his tax card (i.e., report form) to solicit income tax-related information. The taxpayer, upon receipt of his tax card, forwards it to the payroll department of his employer (i.e., a third party in possession of the reporting data). The payroll department either manually types or writes in the taxpayer's income tax data in the tax card. The completed tax card is then returned to the taxpayer. The taxpayer makes his tax declaration based on the data in his tax card along with additional data in the taxpayer's possession. Both the tax declaration and the completed tax card are returned to the Inland Revenue completing the tax reporting process.

There are several problems with the existing reporting process. When data are entered manually in the report form transcription errors can occur. Data can be entered in the wrong place. Data can be incorrectly transferred from the payroll department's record to the report form. Basically, manual entry of data introduces human errors. Another problem with the existing reporting process is delay. Time is consumed in getting the report form to the reporting party, completing the report form manually, and returning the completed report form back to the requesting agency. Delays are sometimes lengthened due to scheduling conflicts with other projects in the payroll department. Still another problem with the existing reporting process is cost. Labor cost relating to data entry for the reporting party and the manual labor required to retrieve the data from the report form for the agency or entity can be significant. Additionally, there are costs to archive the paper report form, mail, print, and dispose of the report form.

Accordingly, it may be useful to provide an enhanced reporting process that permits a party to electronically enter data on a report form pertaining to a named individual in the form, a party to electronically incorporate additional data on the completed report form to generate a separate report or declaration, and a party to electronically interact with the requesting agency.

BRIEF DESCRIPTION OF THE DRAWINGS

The present invention is illustrated by way of example, and not by way of limitation, in the figures of the accompanying drawings, in which like reference numerals refer to similar elements and in which:

FIG. 1b is a schematic diagram showing one embodiment of an electronic interface of the reporting process of FIG. 1a.

SUMMARY

Figure 1A:
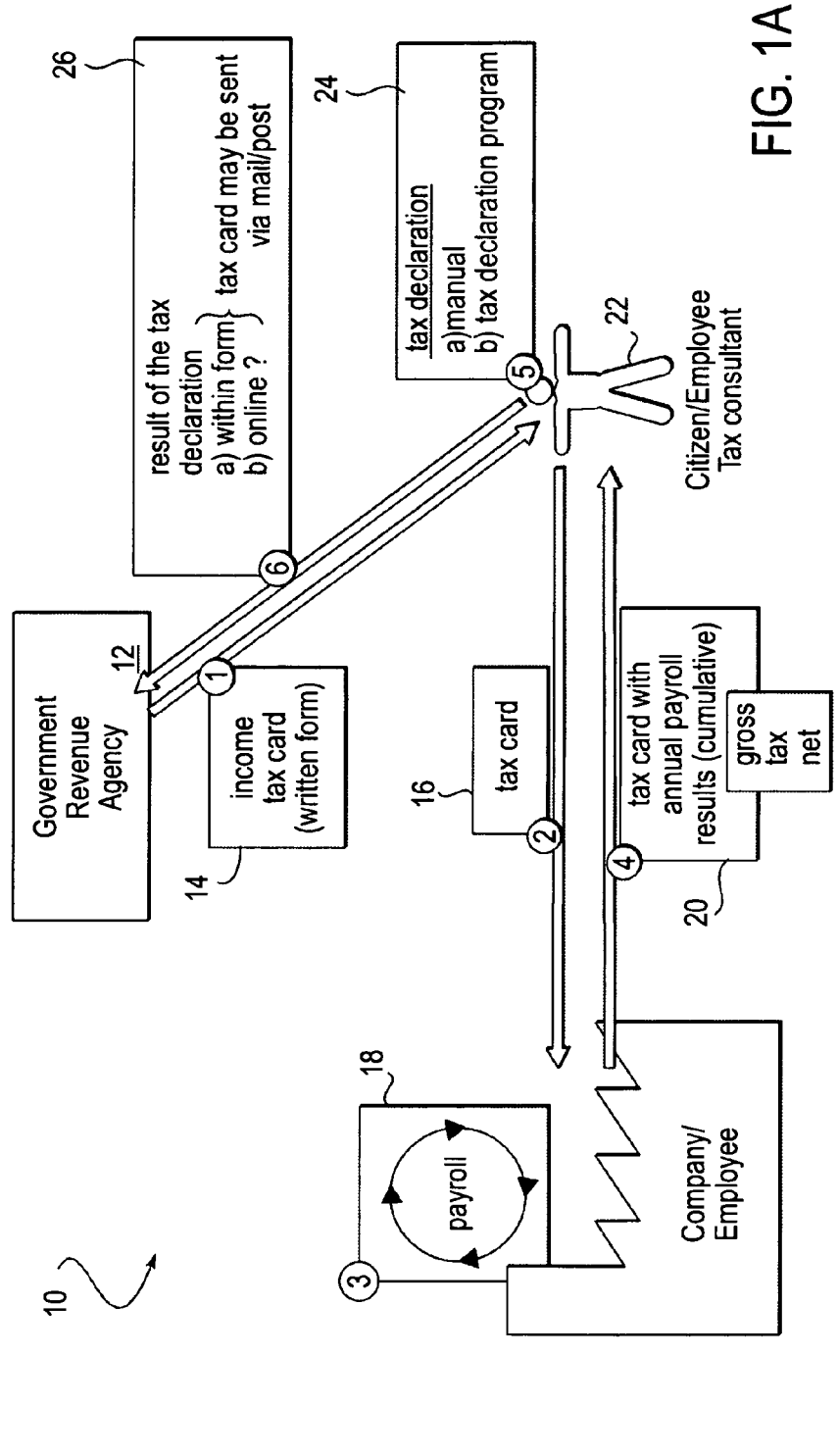
FIG. 1a is a schematic diagram illustrating an embodiment of a reporting process between a user, a third party and an agency.

A method for submitting electronic data to a requesting agency in accordance with one embodiment includes receiving an electronic report form for a named individual or entity from an agency. The report form is forwarded to a third party, who is in possession of data regarding the named individual. The third party electronically completes the report form with data derived from its systems. The completed report form is returned to the named individual or entity for submission to the requesting agency.

In another embodiment, the named individual accesses the agency's systems to retrieve or download the report form. The individual transfers the report form to a third party for completion. The third party enters the requisite information on the report form. The completed report form is returned to the named individual.

In yet another embodiment, the electronic report form pertaining to a named individual or entity is sent directly to a party in possession of the data requested by the agency. The receiving party may authenticate the report form. Then, receiving party retrieves the requisite data from its system and electronically completes the report form. The receiving party returns the completed report form to the requesting agency.

In still another embodiment, a requesting entity or agency sends an electronic token to a user for providing information to the entity. The user forwards the electronic token to a third party to modify the token. The third party modifies the electronic token responsive to activity of the user. The modified electronic token is returned to the user. The user returns the modified token to the requesting entity. Alternatively, the third party returns the modified electronic token to the requesting entity for the user.

These and other aspects of the present invention will become apparent to those of skill in the art upon reading of the following descriptions and a study of the several figures of the drawings.

DETAILED DESCRIPTION

A method for submitting electronic data to a requesting entity in accordance with one embodiment includes receiving a report form electronically from the requesting agency by an individual, who needs to report data to the requesting agency. The individual forwards the report form to a party in possession of the requested data. The receiving party accesses a memory for the request data to complete the report form. Alternatively, if the individual has access to the requested data, the individual may access the memory to obtain the data needed to complete the report form. The individual or the party completing the form returns the completed report form to the requesting entity.

The following description sets forth numerous specific details to provide a thorough understanding of the present invention. It will be apparent to one skilled in the art that the present invention can be practiced without one or more of the specific details, or with other methods, components, materials, etc. In other instances, well-known structures and operations are not shown or described in detail to avoid unnecessarily obscuring aspects of various embodiments of the present invention.

Advantageously, according to certain embodiments of the invention, the harmful effects of transcription errors caused by human errors can be eliminated by electronically reporting data to a requesting agency. Further, the reporting process may be more efficient, minimizing time delay due to scheduling and labor conflicts and greatly reducing costs associated with labor, storage, printing, copying, postage, and overall environmental costs. The embodiments may be suitable for various types of reporting processes including income tax reporting, auditing, and any transaction that requires providing data to an entity.

An electronic reporting process where an agency requests income tax related information from an individual is illustrated in some of the figures. However, other compliance or reporting operations may be performed in a similar manner, such as financial/accounting reporting, environmental reporting, other regulatory reporting and other such processes. The individual requests the required information from the employer. The income tax related information is ultimately returned to the requesting agency. FIG. 1a is a schematic diagram illustrating an embodiment of a reporting process between a user, a third party and an agency. The tax agency, Inland Revenue 12 requests income tax related information in a tax card pertaining to the individual named in the tax card in transaction 14. In one embodiment, the tax card can be sent electronically to the individual named in the tax card. In another embodiment, the tax card is provided to the individual in a smart card. In yet another embodiment, the tax card can be stored in any portable storage media such as a cig@r drive, CD-ROM, or floppy disk and delivered to the individual 22. In yet another embodiment, an individual 22 can retrieve the tax card by signing onto the Inland Revenue network 12 or similar network to electronically download the card.

The individual forwards the tax card to the payroll department of the employer in transaction 16. The payroll department 18 retrieves income tax information pertaining to the individual named in the tax card from its payroll system and completes the tax card electronically. The payroll department 18 returns the completed tax card to the individual in transaction 20.

The completed tax card now contains tax information the named individual needs to make a tax declaration with the Inland Revenue. The individual using the income tax information from the tax card along with additional tax information in the individual's possession makes the tax declaration in transaction 24. The tax declaration and completed tax card is sent to the Inland Revenue 10 in transaction 26.

Another embodiment of FIG. 1a may include additional parts if the individual changes employers during the tax year. The additional parts include the previous employer entering payroll information up to the last pay period in the tax card and returning the card to the individual 22. The partially completed tax card is given to the new employer to be completed for the rest of the taxable year before returning the card to the individual 22. When the individual 22 receives the completed tax card, the individual makes the tax declaration based on the data from the completed tax card and additional data in the individual's possession as in transaction 24.

Figure 1B:
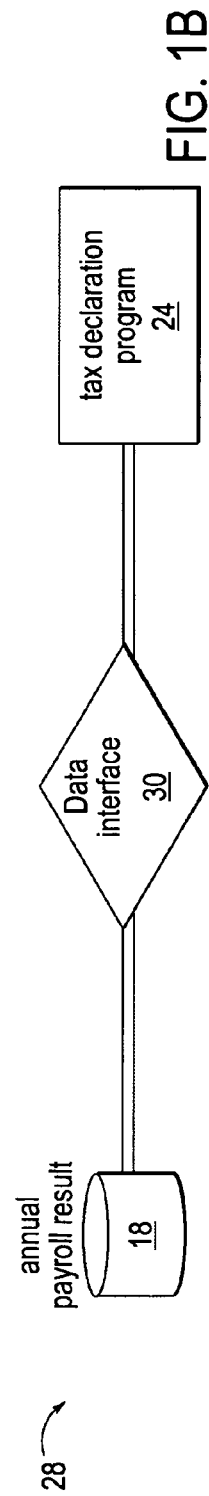

FIG. 1b illustrates, in one embodiment, an electronic reporting process where the individual with an obligation to report data can access the payroll result database to obtain the require data to complete the report form. In particular, FIG. 1b is a schematic diagram showing one embodiment of an electronic interface of the reporting process of FIG. 1a. After obtaining or receiving a tax card from the Inland Revenue 10, the individual 22 accesses his employer's annual payroll result database 18 to obtain income tax information.

In one embodiment, individual 22 can access the payroll result database 18 by logging onto an account and can obtain the requisite data to complete the report form. In another embodiment, the report form is electronically sent to the payroll result database 18 to be completed automatically. Payroll result database 18 interacts with an application that allows it to accept blank report forms for a company's employees from the Inland Revenue 12 and enters the requested data in the form.

Data interface 30 can be a direct link between the annual payroll result database 18 and tax declaration program 24. Alternatively, data interface 30 can be a private network connection linking the annual payroll result database 18 to the tax declaration program 24. In another embodiment, data interface 30 can be a connection established by individual 22 or the individual's employer using an Internet service provider (ISP) connection. In yet another embodiment, data interface 30 can be a dial-up modem connection. Tax declaration program 24 is an application that allows an individual to use the data retrieved from the payroll result database 18 to make a tax declaration to the Inland Revenue 12.

Figure 2:
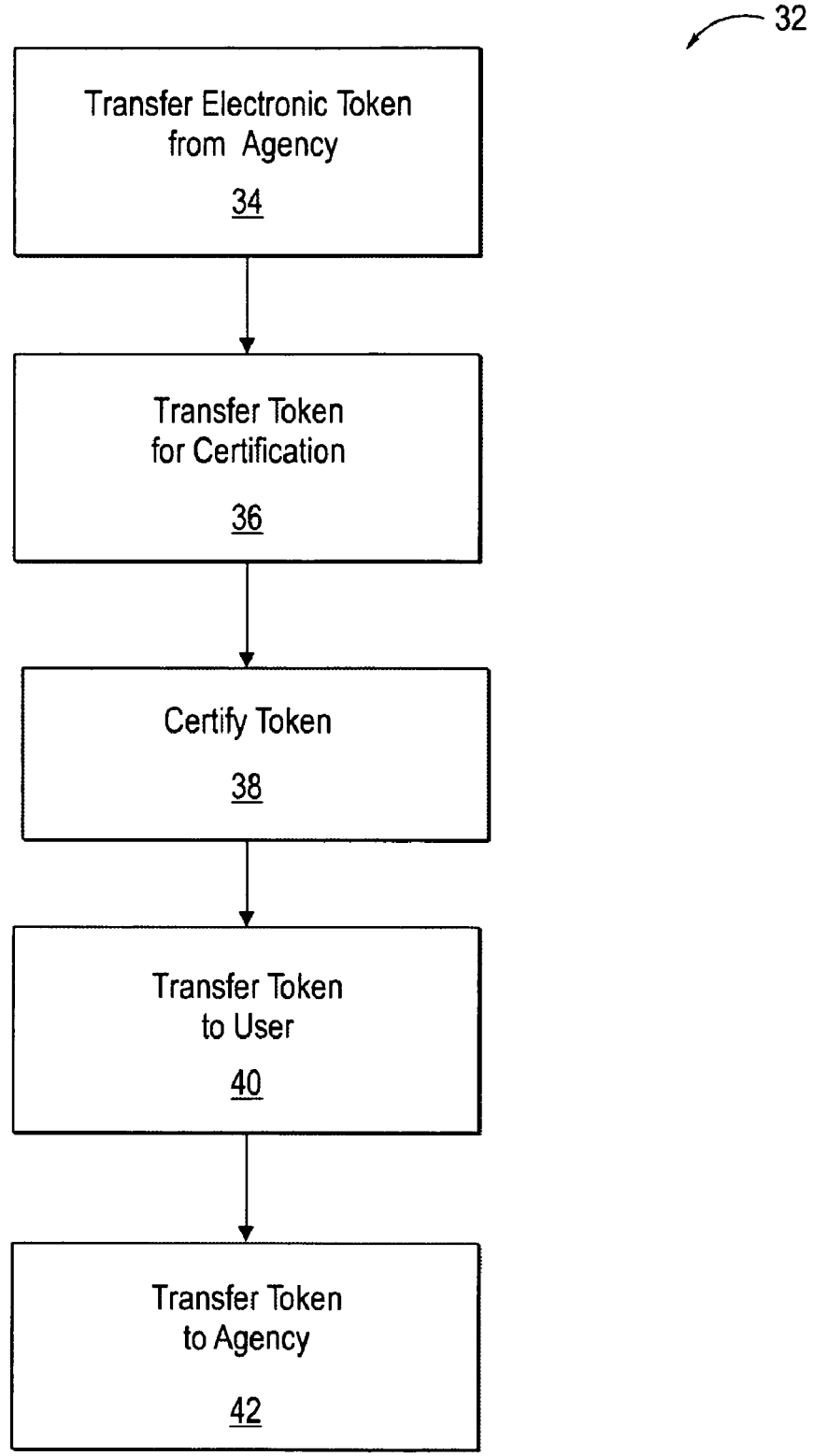
FIG. 2 is a flow diagram illustrating an embodiment of the reporting process.

Also illustrated is an electronic reporting process where a requesting agency seeks information from a party through the use of an electronic token. FIG. 2 is a flow diagram illustrating an embodiment of the reporting process. The party is a user of the reporting process. Process 32 and other processes described in this document are composed of modules or transactions, which may be organized in a parallel or serial fashion, for example. The reporting process begins with the agency transferring an electronic token to a user, who needs to comply with the request for information in module 34. The receiving user transfers the electronic token to a third party such as a certification authority for certifying the token in module 36. The certification authority in module 38 certifies the electronic token. The certified token is returned to the user, who needs to comply with the agency's request, in module 40. The user in module 42 transfers the certified token back to the requesting agency. Alternatively, the third party can send the certified token to the requesting agency on behalf of the user.

Figure 3:
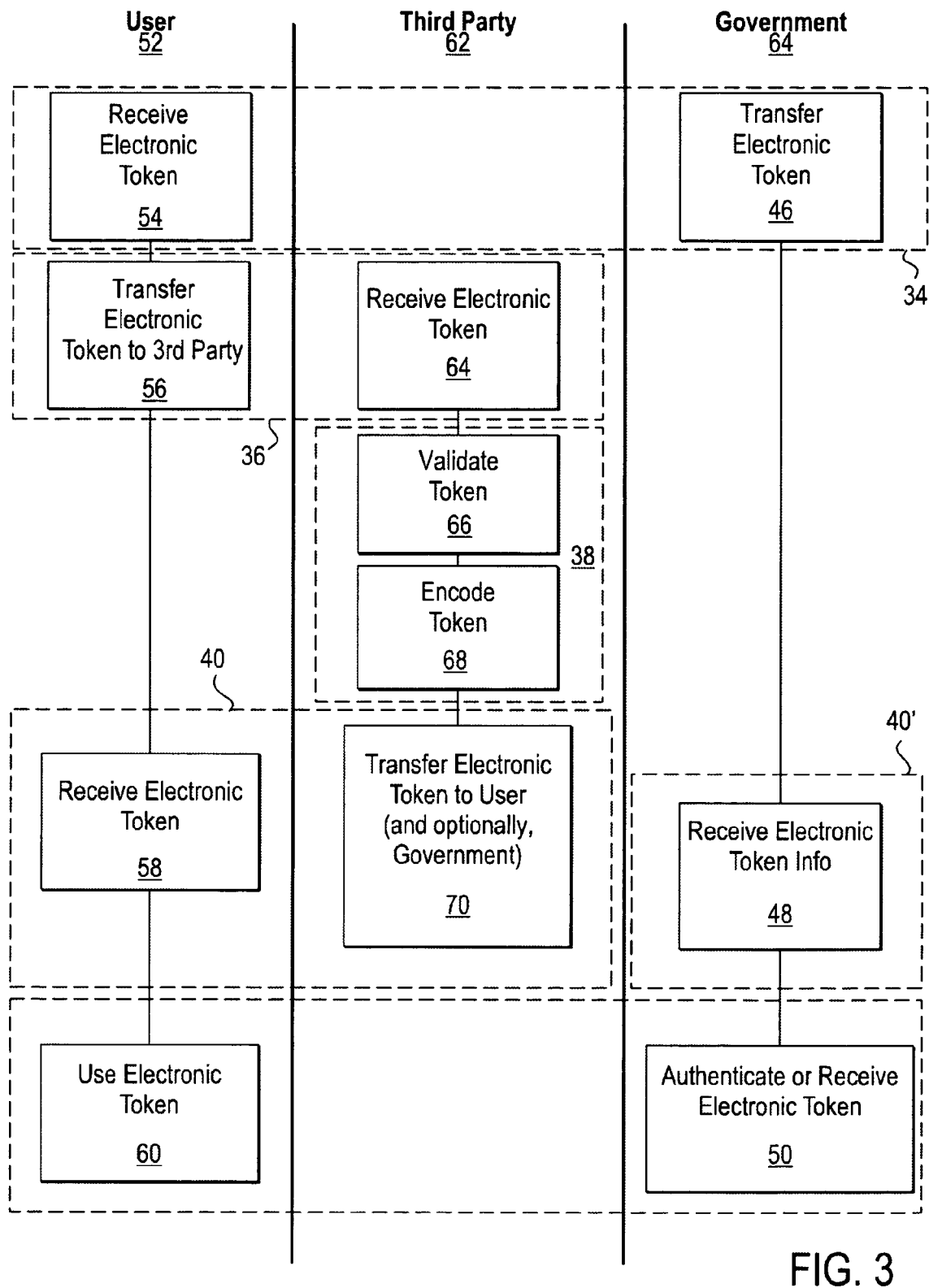
FIG. 3 is a flow diagram illustrating an embodiment of the reporting process from the perspective of an agency, a user and a third party.

In relation to FIG. 2, a reporting process from the perspective of an agency is illustrated. FIG. 3 is a flow diagram illustrating an embodiment of the reporting process. The flow diagram is divided into three parts, each representing a perspective on the process, or a participant's portion of the process. Part 52 represents a user perspective, part 62 represents a third-party perspective, and part 64 represents a government or agency perspective. Parts 52, 62 and 64 may effectively be independent processes, which may interact with each other or with similar processes.

Referring to part 64, the government or agency perspective is illustrated. The agency may be expected to transfer a token to a user, receive the token from the user, and authenticate the token. Additionally, the agency may receive the token or a copy thereof from a third party. In module 46, the agency transfers an electronic token to a user, who needs to comply with the agency's request for information. Optionally, the agency receives the electronic token from the third party such as a certification authority in module 48. Alternatively, the agency in module 50 receives the electronic token from the user needing to comply with the agency's request, if the third party did not send it in module 48. The agency also authenticates the electronic token upon receipt in module 50.

Referring to part 52, a reporting process from the perspective of a user who needs to comply with the agency's request is illustrated. The user may be expected to receive a token, transfer the token to a third party, receive the token from the third party with information and/or validation, use the token and data therein, and return the token to an agency. The user in module 54 receives an electronic token from the requesting agency. The token in module 56 is transferred to a third party such as a certification authority for validation and encoding. The user receives the validated electronic token from the third party in module 58. The user uses the data contained in the electronic token in module 60 to comply with the agency's request. Alternatively, if the user does not need to take further actions to complete compliance the user will merely return the electronic token to the requesting agency in module 60.

Additionally, referring to part 62, a reporting process from the perspective of a third party such as a certification authority who is certifying the electronic token on behalf of the user is illustrated. The third party may be expected to receive a token, validate and/or encode the token, and return the token or pass the token on. The third party in module 64 receives an electronic token from the user. The token is validated in module 66 and encoded in module 68. The third party in module 70 returns the validated electronic token to the user. Alternatively, the third party transfers the validated token to the requesting agency.

Figure 4:
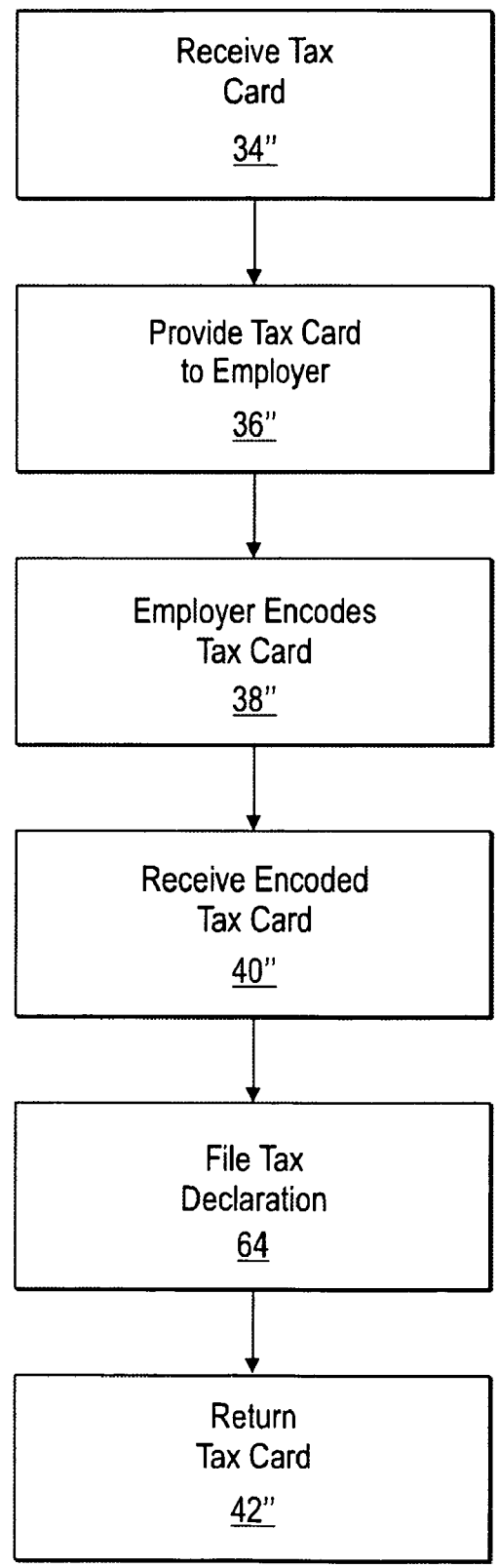
FIG. 4 is a flow diagram illustrating another embodiment of a reporting process.

In yet another embodiment, an electronic reporting process where a tax agency presents a tax card to an individual is provided. The tax card is given to the employer for encoding. The employer encodes the tax card with the individual's income tax information and returns the card to the individual. The completed tax card is used to make a tax declaration. FIG. 4 is a flow diagram illustrating another embodiment of a reporting process. A taxpayer in module 34" receives a tax card from a tax agency. The taxpayer provides the tax card to the employer in module 36". The employer encodes the taxpayer's tax card in module 38". The taxpayer in module 40" receives the encoded tax card from the employer. The taxpayer uses the information in the encoded tax card and files the tax declaration in module 64. The encoded tax card is returned to the tax agency in module 42".

Figure 5:
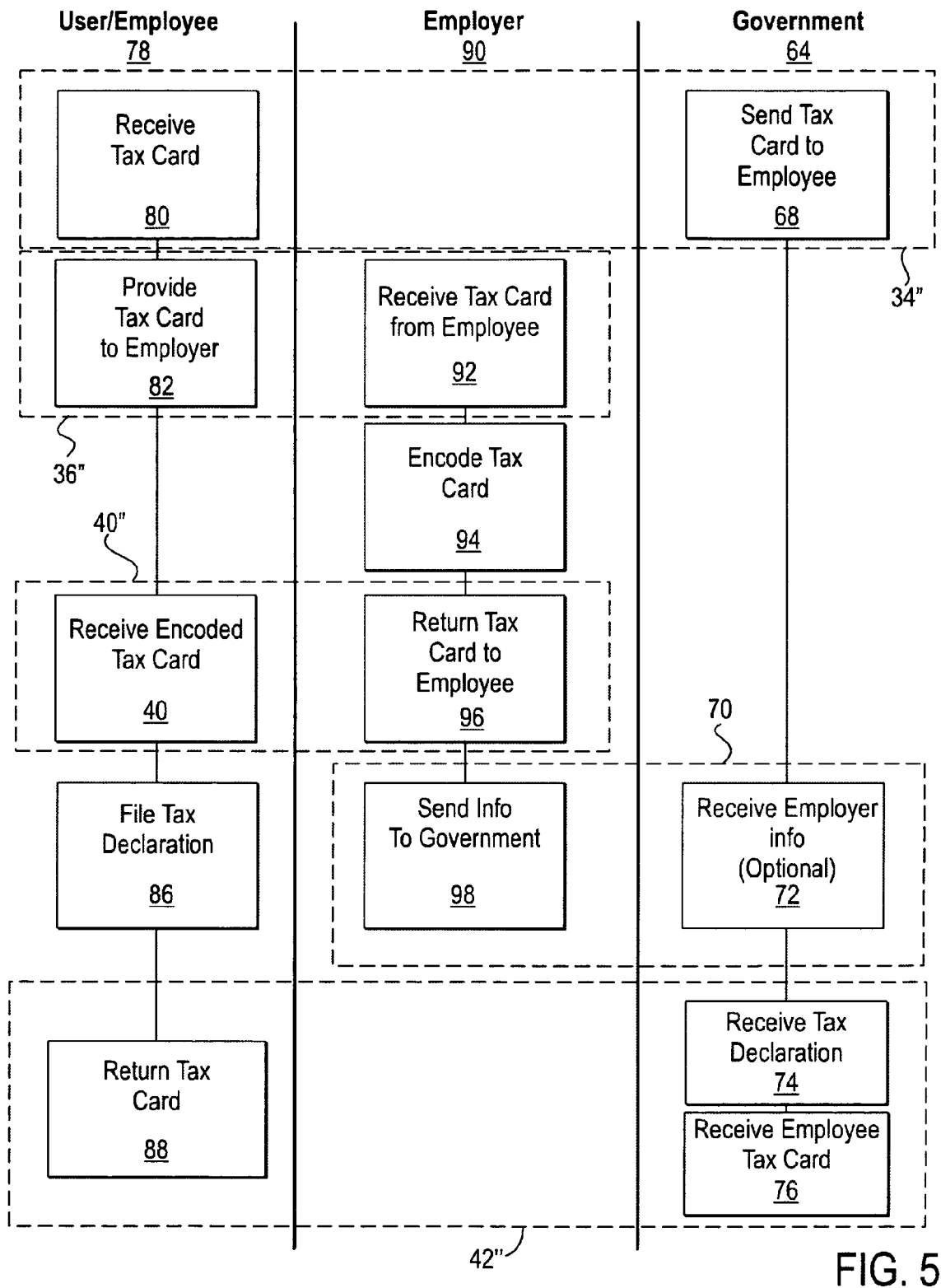
FIG. 5 is a flow diagram illustrating the reporting process of FIG. 4 from the perspective of an agency, an employee and an employer.

FIG. 5 is a flow diagram illustrating the reporting process of FIG. 4 from several perspectives. FIG. 5 illustrates a user perspective (78), an employer perspective (90) and an agency perspective (64). The processes illustrated may operate as independent processes (interacting with similar processes) or as an integrated process.

The reporting process from the perspective of a tax agency is illustrated as part 64. The tax agency may be expected to send a tax card to a taxpayer, receive the tax card from the taxpayer and receive a tax declaration from the taxpayer. The tax agency may also be expected to receive a copy of the tax card from an employer. In module 68, the tax agency sends a tax card to a taxpayer, who needs to file a tax declaration. Optionally, in module 72 the agency receives the tax card from the employer. Alternatively, the tax agency in module 74 receives the tax declaration from a taxpayer, who needs to file a tax return. In module 76, the tax agency receives the tax card from the employee.

Similarly, a reporting process from the perspective of an employee who is obliged to report income tax information to the tax agency is provided as process 78. The employee may be expected to receive a tax card from an agency, provide the tax card to an employer, receive the tax card with information from the employer, use the tax card and provide the tax card to the agency. The employee in module 80 receives the tax card from the tax agency. The tax card can be sent electronically to the employee in the form of an email attachment. It can also be delivered to the employee in a CD-ROM, Smart card, or in any portable electronic storage media. Alternatively, the employee can access the tax agency's system and download his tax card. The employee in module 82 provides the tax card to an employer for encoding. The encoded tax card is returned to the employee in module 84. The employee uses the income tax information in module 86 to file a tax declaration with the tax agency. The employee also forwards the encoded tax card to the tax agency in module 88.

Moreover, an illustration of a reporting process from the perspective of an employer who maintains or possesses the employee's income tax information is provided as process 90. The employer may be expected to receive a tax card, encode information into the tax card, and return the tax card to an employee. The employer may also be expected to return a copy of the tax card to an agency. The employer in module 92 receives a tax card from its employee. The tax card is encoded with the employee's income tax information in module 94. The employer in module 96 returns the encoded tax card to its employee. Additionally, the employer may send a copy of the tax card to the tax agency in module 98.

Figure 6:
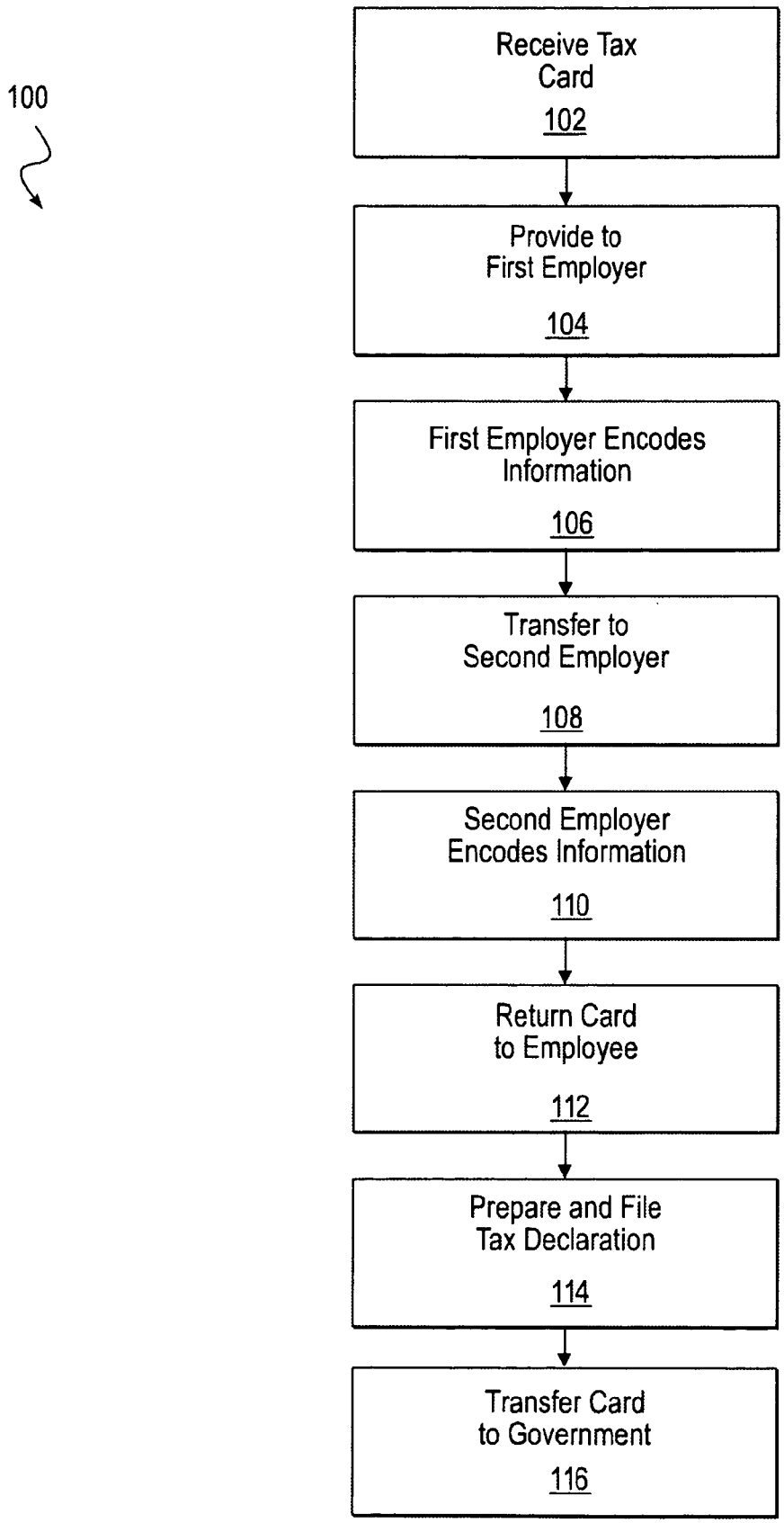
FIG. 6 is a flow diagram illustrating yet another embodiment of a reporting process.

In another embodiment, a reporting process where the employee leaves the first employer in the middle of the tax year and joins a second employer during a tax year is provided. FIG. 6 is a flow diagram illustrating yet another embodiment of a reporting process. The employee receives a tax card from the tax agency in module 102. The tax card can be sent electronically to the employee in the form of an email attachment. It can also be delivered to the employee in a cig@r drive, CD-ROM, Smart card, or in any portable electronic storage media. Alternatively, the employee can access the tax agency's systems and downloads the tax card. In module 104, the tax card is provided to the first employer. The first employer encodes information onto the tax card in module 106. The employee terminates employment with the first employer and retrieves the tax card from the employer. The first employer should encode income tax information up to the departure date.

The employee joins the new employer and transfers the tax card to the second employer in module 108. Note that the switch of employers may occur at a different time from the transfer of the tax card. The second employer in module 110 encodes tax information for the rest of the tax year. The encoded tax card is returned to the employee in module 112. The second employer can return the encoded tax card in an email attachment to the employee, for example. It can also return the tax card in a cig@r drive, CD-ROM, Smart card, or in any portable electronic storage media to the employee, for example. Alternatively, the employee can access the employer's systems to download the encoded tax card. The employee uses the information contained in the encoded tax card to prepare and file a tax declaration in module 114. The encoded tax card is returned to the tax agency in module 116.

Figure 7:
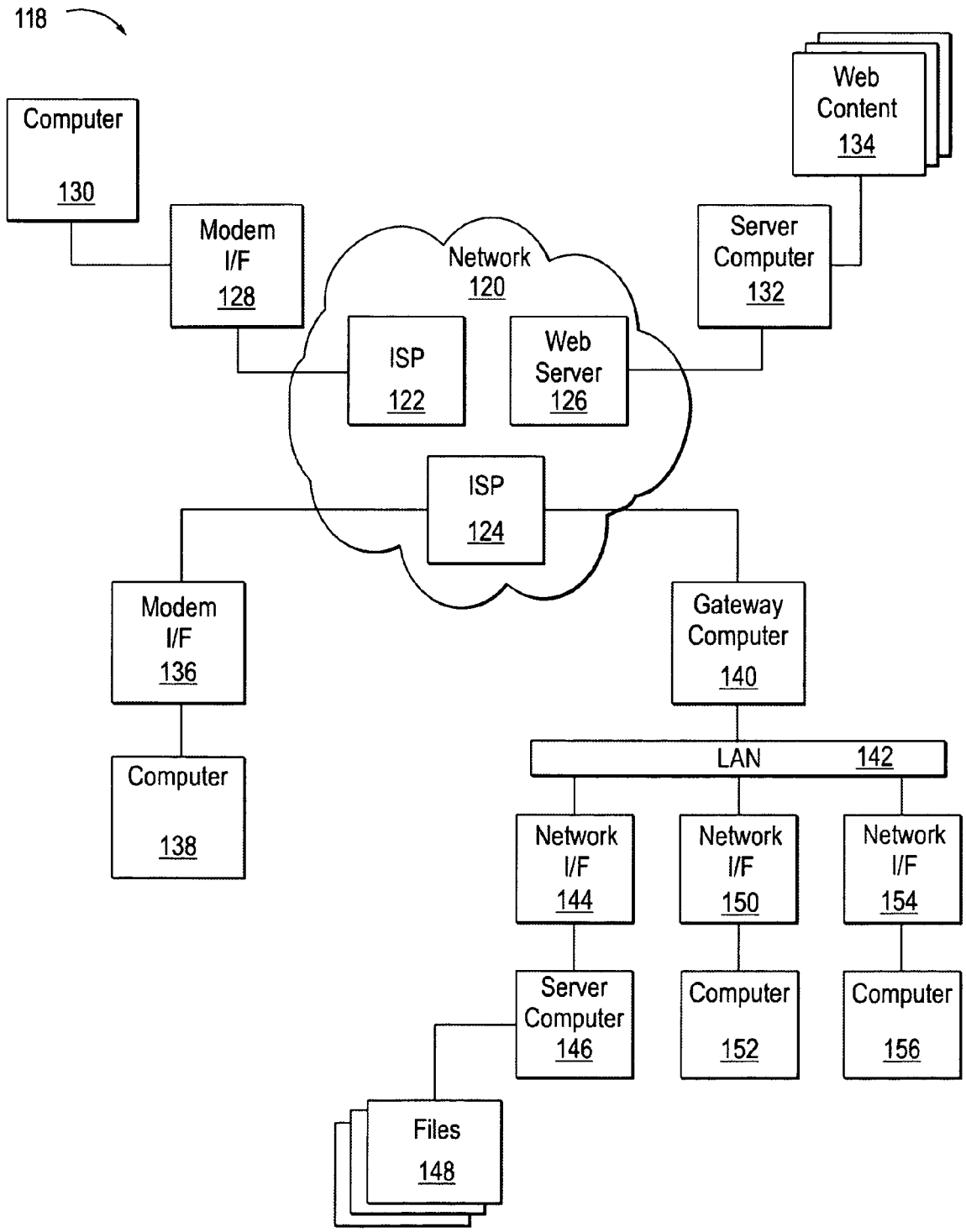
FIG. 7 is a schematic diagram showing an embodiment of a network configuration.
Figure 8:
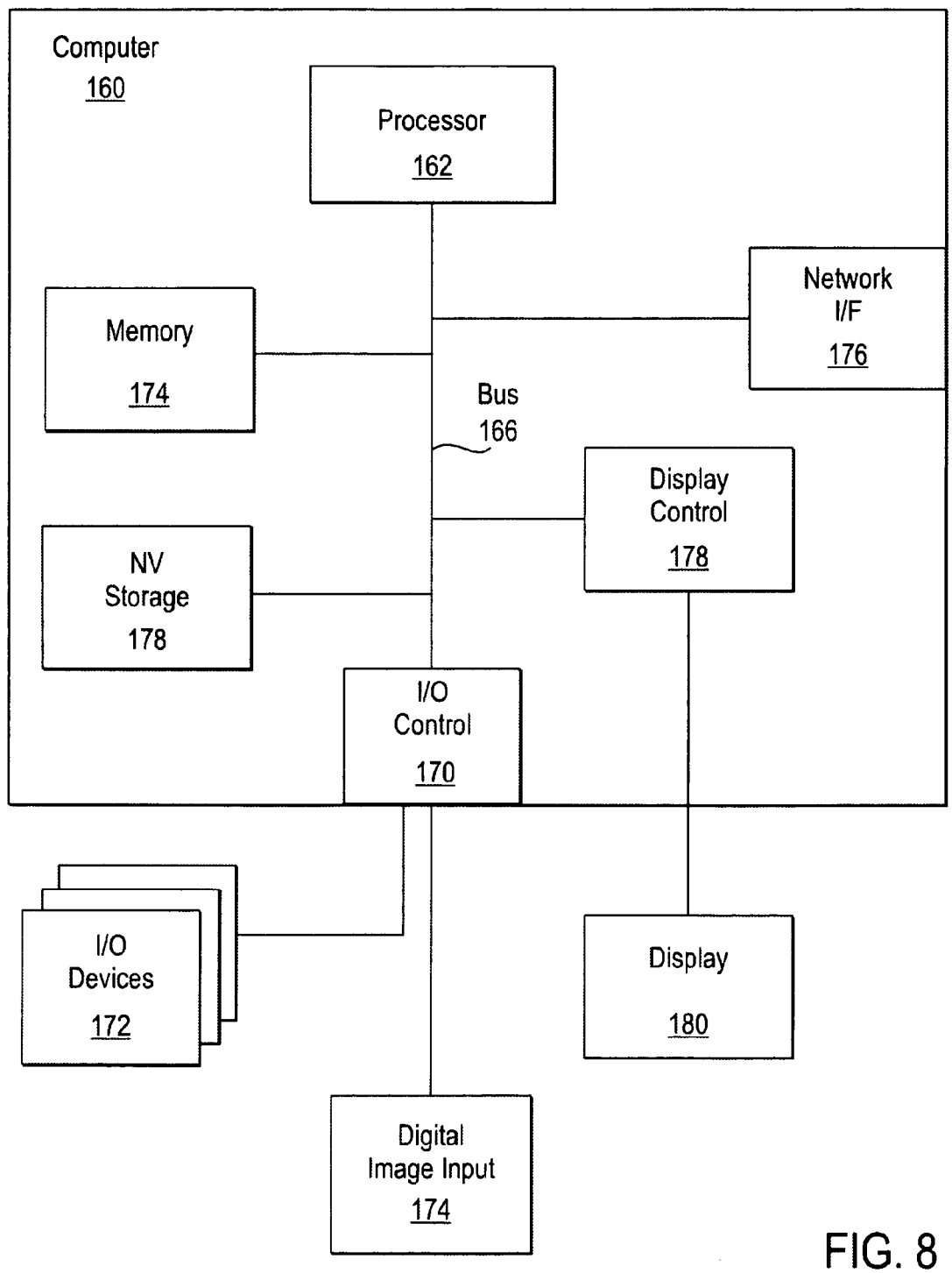
FIG. 8 is a schematic diagram depicting an embodiment of a conventional computer system.

The following description of FIGS. 7-8 is intended to provide an overview of computer hardware and other operating components suitable for performing the methods of the invention described above and hereafter, but is not intended to limit the applicable environments. The invention can be practiced with other computer system configurations, including handheld devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 shows a network 120 configuration, such as the Internet, interconnecting several computer systems together. The term "Internet" as used herein refers to a network of networks which uses certain protocols, such as the TCP/IP protocol, and possibly other protocols such as the hypertext transfer protocol (HTTP) for hypertext markup language (HTML) documents that make up the world wide web (web). The physical connections of the Internet and the protocols and communication procedures of the Internet are well known to those of skill in the art.

Access to the Internet 120 is typically provided by Internet service providers (ISP), such as the ISPs 122 and 124. Users on client systems, such as client computer systems 130, 138, 152, and 156, obtain access to the Internet through Internet service providers, such as ISPs 122 and 124. Access to the Internet allows users of the client computer systems to exchange information, receive and send e-mails, and view documents. The web server 126 is typically at least one computer system which operates as a server computer system and is configured to operate with the protocols of the world wide web and is coupled to the Internet. Optionally, the web server 126 can be part of an ISP, which provides access to the Internet for client systems. The web server 126 is shown coupled to the server computer system 132 which itself is coupled to web content 134. The web content 134 can be regarded as a form of content database. While two computer systems are shown in FIG. 7, the web server system 126 and the server computer system 132 can be implemented in one computer system having the web server functionality and the server computer functionality, which will be described further below.

Client computer systems 130, 138, 152, and 156 can each, with the appropriate web browsing software, view HTML pages provided by the web server 126. The ISP 122 provides Internet connectivity to the client computer system 130 through the modem interface 128, which can be considered part of the client computer system 130. The client computer system can be a personal computer system, a network computer, a web TV system, or other such computer system.

Similarly, the ISP 124 provides Internet connectivity for client computer systems 138, 152, and 156, although as shown in FIG. 7, the connections are not the same for these three computer systems. Client computer system 138 is coupled through a modem interface 136 while client computer systems 152 and 156 are part of a local area network (LAN). While FIG. 7 depicts modem interfaces 128 and 136, generically as "modem," each of these interfaces can be an analog modem, ISDN modem, cable modem, satellite transmission interface (e.g. "direct PC"), or other interfaces for interconnecting a computer system to a network.

Client computer systems 152 and 156 are coupled to a LAN 142 through network interfaces 150 and 154, which can be an Ethernet or other network interfaces. The LAN 142 is also coupled to a gateway computer system 140, which can provide firewall and other Internet related services for the local area network. This gateway computer system 140 is coupled to the ISP 124 to provide Internet connectivity to the client computer systems 152 and 156. Both the web server system 126 and the gateway computer system 140 can be a conventional server computer system.

Alternatively, a server computer system 146 can be directly coupled to the LAN 142 through a network interface 144 to provide direct communication between client computers 152 and 156 and files 148 and other services, without the need to connect to the Internet through the gateway system 140.

FIG. 8 depicts one example of a conventional computer system that can be used as a client computer system or a server computer system or as a web server system. Such a computer system can be used to perform many of the functions of an Internet service provider, such as ISP 122. The computer system 160 interfaces to external systems through the modem or network interface 176. It will be appreciated that the modem or network interface 176 can be considered to be part of the computer system 160. This interface 176 can be an analog modem, ISDN modem, cable modem, token ring interface, satellite transmission interface (e.g. "direct PC"), or other interfaces for coupling a computer system to other computer systems.

The computer system 160 includes a processor 162, which can be a conventional microprocessor such as an Intel Pentium® microprocessor or Motorola power PC microprocessor. Memory 164 is coupled to the processor 162 by a bus 166. Memory 164 can be dynamic random access memory (DRAM) and can also include static random access memory (SRAM). The bus 166 couples the processor 162 to the memory 164, to non-volatile storage 168, to display controller 178, and to the input/output (I/O) controller 170.

The display controller 178 controls display device 180, which can be a cathode ray tube (CRT), liquid crystal display (LCD), etc. The input/output devices 172 can include a keyboard, disk drives, printers, a scanner, and other input and output devices, including a mouse or other pointing device. The display controller 178 and the I/O controller 170 can be implemented with conventional well-known technology. A digital image input device 174 can be a digital camera which is coupled to an I/O controller 170 in order to allow images from the digital camera to be input into the computer system 160.

The non-volatile storage 168 is often a magnetic hard disk, an optical disk, or another form of storage for large amounts of data. Some of the data is often written, by a direct memory access process, into memory 164 during execution of software in the computer system 160. One of skill in the art will immediately recognize that the terms "machine-readable medium" or "computer-readable medium" includes any type of storage device that is accessible by the processor 162 and also encompasses a carrier wave that encodes a data signal.

The computer system 160 is one example of many possible computer systems, which have different architectures. For example, personal computers based on an Intel microprocessor often have multiple buses, one of which can be an input/output (I/O) bus for the peripherals and one that directly connects the processor 162 and the memory 164 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 164 for execution by the processor 162. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 160 is controlled by operating system software, which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the Linux operating system and its associated file management system. The file management system is typically stored in the non-volatile storage 168 and causes the processor 162 to perform the various acts required by the operating system to input and output data and to store data in memory, including storing files on the non-volatile storage 168.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

While specific embodiments of the invention have been illustrated and described herein, it will be appreciated that various changes can be made therein without departing from the spirit and scope of the invention.

What is claimed is:

1. A computer-implemented method for reporting data to an agency, the method comprising:
   receiving a report form electronically from the agency, wherein the report form is a blank tax card to be filled in with tax information about the first party in order to make a tax declaration;
   forwarding, using a processor, the report form from the first party to a second party for completion, wherein the second party is an employer of the first party;
   receiving a completed report form from the second party, the completed report form being produced by the second party with data obtained by accessing a computer memory device, the data being related to the first party; and
   electronically filing, by the first party, a tax declaration with the agency using the tax information from the completed report form,
   wherein the tax declaration is different from the completed report form, and wherein a copy of the completed report form is provided to the agency by the second party.

2. The method of claim 1, wherein the agency is a government tax entity and the report form comprises an electronic tax card.

3. The method of claim 1, wherein the tax declaration is completed electronically using a tax declaration program.

4. The method of claim 1, further comprising:
   receiving an electronic token from a government entity;
   providing the electronic token to a third party, the third party to modify the electronic token; and
   receiving the electronic token from the third party, the electronic token in modified form.

5. At least one non-transitory computer-readable medium comprising program instructions, which, when executed by at least one processor, cause the processor to perform a method for reporting data to an agency, the method comprising:
   receiving a report form electronically from the agency by a first party, wherein the report form is a blank tax card to be filled in with tax information about the first party in order to make a tax declaration;
   forwarding the report form from the first party to a second party for completion, wherein the second party is an employer of the first party;
   receiving a completed report form from the second party, the completed report form being produced by the second party with data obtained by accessing a computer memory device, the data being related to the first party; and
   electronically filing, by the first party, a tax declaration with the agency using the tax information from the completed report form,
   wherein the tax declaration is different from the completed report form, and wherein a copy of the completed report form is provided to the agency by the second party.

6. The computer-readable medium of claim 5, the method further comprising:
receiving an electronic token from a government entity;
providing the electronic token to a third party, the third party to modify the electronic token; and
receiving the electronic token from the third party, the electronic token in modified form.

7. The computer-readable medium of claim 5, wherein the agency is a government tax entity and the report form comprises an electronic tax card.

8. The computer-readable medium of claim 5, wherein the tax declaration is completed electronically using a tax declaration program.

9. The computer-readable medium of claim 5, the method further comprising:
allowing the first party to add additional tax information possessed by the first party to the completed report form; and
forwarding the completed report form electronically from the first party to the agency after the adding of the additional tax information.

10. The computer-readable medium of claim 6, wherein the third party is a certification authority, which certifies the electronic token.

11. The method of claim 1, further comprising:
adding, at the first party, additional tax information possessed by the first party to the completed report form; and
forwarding the completed report form electronically from the first party to the agency after the adding of the additional tax information.

12. The method of claim 4, wherein the third party is a certification authority, which certifies the electronic token.

13. A system for reporting data to an agency, the system comprising:
a first computer system associated with a first party, the first computer system configured to:
receive a report form electronically from an agency, wherein the report form is a blank tax card to be filled in with tax information about the first party in order to make a tax declaration; and
forward the report form for completion; and
a second computer system linked to the first computer system, the second computer system associated with a second party that is an employer of the first party, the second computer system configured to:
receive the report form forwarded by the first computer system;
obtain data for completing the report form, wherein the data is related to the first party; and
return the completed report form to the first computer system,
wherein the first computer system is further configured to electronically file a tax declaration with the agency using the tax information from the completed report form, the tax declaration being different from the completed report form, and wherein the second computer system is further configured to provide a copy of the completed report form to the agency.

14. The system of claim 13, wherein the first computer system is further configured to:
add additional tax information possessed by the first party to the completed report form; and
forward the completed report form electronically to the agency after the adding of the additional tax information.

* * * * *